United States Patent
Wang et al.

(10) Patent No.: US 11,343,086 B2
(45) Date of Patent: May 24, 2022

(54) TRANSMITTER AND RECEIVER FOR TRANSMITTING AND RECEIVING A QUANTUM KEY

(71) Applicant: Huawei Technologies Duesseldorf GmbH, Duesseldorf (DE)

(72) Inventors: Dawei Wang, Munich (DE); David Hillerkuss, Munich (DE); Gerhard Humer, Vienna (AT)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 27 days.

(21) Appl. No.: 16/945,317

(22) Filed: Jul. 31, 2020

(65) Prior Publication Data
US 2020/0389300 A1    Dec. 10, 2020

Related U.S. Application Data (63) Continuation of application No. PCT/EP2018/052698, filed on Feb. 2, 2018.

(51) Int. Cl.
*H04L 9/08* (2006.01)

(52) U.S. Cl.
CPC .................. *H04L 9/0852* (2013.01)

(58) Field of Classification Search
CPC .................. H04L 9/0852; H04L 9/0855
See application file for complete search history.

(56) References Cited

U.S. PATENT DOCUMENTS

| | | | |
|---|---|---|---|
| 2006/0262930 A1* | 11/2006 | Dinu | H04L 9/0858 380/256 |
| 2010/0195831 A1* | 8/2010 | Tanaka | H04L 9/0858 380/256 |

OTHER PUBLICATIONS

Laudenbach et al., "Pilot-assisted intradyne reception for high-speed continuous-variable quantum key distribution with true local oscillator," Retrieved from the Internet: URL: https://arxiv.org/pdf/1712.10242v2.pdf, XP055516084, Total 10 pages (Dec. 2017).

Schrenk et al., "High-Rate Continuous-Variables Quantum Key Distribution with Piloted-Disciplined Local Oscillator," 2017 European Conference on Optical Communication (ECOC), Gothenburg, Sweden, XP033336337, Total 3 pages, Institute of Electrical and Electronics Engineers, New York, New York (Sep. 2017).

Qi et al., "Generating the Local Oscillator "Locally" in Continuous-Variable Quantum Key Distribution Based on Coherent Detection," Physical Review X, vol. 5, No. 4, XP055316967, pp. 1-12, USA (Oct. 2015).

(Continued)

*Primary Examiner* — Baotran N To
(74) *Attorney, Agent, or Firm* — Leydig, Voit & Mayer, Ltd.

(57) ABSTRACT

A transmitter provides an optical signal for transmitting a quantum key over a network. The transmitter comprises a first generator configured to generate a quantum signal, the quantum signal comprising a sequence of frames. The transmitter comprises a second generator configured to generate a pilot signal. The pilot signal comprises a sequence of signatures that is in synchrony with the sequence of frames. The transmitter comprises an optical modulator configured to generate the optical signal by modulating an optical carrier based on the quantum signal and the pilot signal. A corresponding receiver is proposed for receiving the optical signal and for extracting the quantum key.

13 Claims, 6 Drawing Sheets

(56) References Cited

OTHER PUBLICATIONS

Soh et al., "Self-Referenced Continuous-Variable Quantum Key Distribution Protocol," Physical Review X, vol. 5, No. 4, XP055316963, pp. 1-15, USA (Oct. 2015).
"Quantum Key Distribution (QKD); Components and Internal Interfaces," ETSI GS QKD 003ed2 V0.0.3, ETSI Draft Specification; QKD 003, European Telecommunications Standards Institute (ETSI), Retrieved from the Internet URL:docbox.etsi.org/ISG/QKD/70-Drafts/0003ed2/QKD-003ed2v003.pdf, XP014303537, pp. 1-49, Sophia Antipolis Cedex, France (Jun. 2017).
Kleis et al., "Simple and Efficient Detection Scheme for Continuous Variable Quantum Key Distribution with m-ary Phase-Shift-Keying," 2015 Conference on Laser and Electro-Optics (CLEO), San Jose, CA, USA, Total 2 pages, Institute of Electrical and Electronics Engineers, New York, New York (May 2015).
Huang et al., "High-speed continuous-variable quantum key distribution without sending a local oscillator," Optics Letters, vol. 40, No. 16, pp. 3695-3698, Optical Society of America (Aug. 15, 2015).

\* cited by examiner

TRANSMITTER AND RECEIVER FOR TRANSMITTING AND RECEIVING A QUANTUM KEY

CROSS-REFERENCE TO RELATED APPLICATIONS

This application is a continuation of International Application No. PCT/EP2018/052698, filed on Feb. 2, 2018, the disclosure of which is hereby incorporated by reference in its entirety.

TECHNICAL FIELD

The present application generally relates to the field of communication network technology. Particularly, the present application relates to quantum key distribution.

BACKGROUND

Quantum key distribution (QKD) is based on quantum carriers, also referred to as quantum signals, typically single-photon or strongly attenuated light pulses, for sharing a secret electronic key. A sequence of such light pulses, i.e. quantum signals, is transmitted from a transmitter via a quantum channel to a receiver wherein each light pulse encodes a key bit. The quantum properties of light, in particular the Heisenberg uncertainty principle, ensure that these key bits cannot be read without disturbing the quantum state of the photons. Public communications over an additional classical channel are then used to estimate the maximum amount of information that a potential eavesdropper may have acquired, and to distil a secret key out of the raw data.

Several practical schemes for QKD have been proposed and implemented in the past, including discrete-variable and continuous-variable (CV) QKD. CV QKD systems make use of a continuous quantum variable, such as the electric field amplitude, as potentially more efficient alternatives to conventional photon-counting QKD techniques. From a practical point of view, the CV approach has potential advantages because it is compatible with standard optical telecommunication technologies.

Current CV QKD systems use reference pulses transmitted from the transmitter to the receiver for estimating channel impairments and rely on discrete pulses to encode quantum signals. For instance, compensating channel impairments by transmitting special reference signals, such as strong pilot tones at other frequencies, has been proposed in the article "Simple and Efficient Detection Scheme for Continuous Variable Quantum Key Distribution with m-ary Phase-Shift-Keying"; Sebastian Kleis, Reinhold Herschel, Christian G. Schaffer; CLEO: 2015, OSA (2015). Compensating channel impairments on the basis of reference pulses transmitted at different times than the quantum signals has been suggested in Bing Qi, Pavel Lougovski, Raphael Pooser, Warren Grice, and Miljko Bobrek, "Generating the local oscillator locally in continuous-variable quantum key distribution based on coherent detection", Phys. Rev. X 5, 041009 (2015); D. Huang, P. Huang, D. Lin, C. Wang, and G. Zeng, "High-speed continuous-variable quantum key distribution without sending a local oscillator", Optics Letters 40, 3695 (2015); and Daniel B. S. Soh, Constantin Brif, Patrick J. Coles, Norbert Lutkenhaus, Ryan M. Camacho, Junji Urayama, and Mohan Sarovar, "Self-referenced continuous-variable quantum key distribution protocol", Phys. Rev. X 5, 041010 (2015).

In known communication systems other than QKD, synchronization information of the data is often inserted into the data stream itself. The synchronization information can be a preamble or other unique data signatures that define the exact beginning of a frame. In QKD systems, the signal level of the quantum signal is very low, and therefore it is not possible to indicate the beginning of a frame by a preamble having a length of one symbol or a few symbols in the quantum signal. Instead, a very long preamble would be required that would significantly reduce the data rate available for key distribution.

In known QKD systems a separate frame or trigger channel is provided instead of such a preamble. However, using such a frame or trigger channel is at a disadvantage inasmuch as the frame or trigger channel has to be processed separately.

SUMMARY

Having recognized the above-mentioned disadvantages and problems, the present application aims at improving the state of the art. In particular, an object of the present application is to provide a transmitter for transmitting a quantum key, a receiver for receiving a quantum key and methods for transmitting and receiving a quantum key.

This object is achieved by the features of the independent claims. Further embodiments of the present application are apparent from the dependent claims, the description and the figures.

According to a first aspect, the present application relates to a transmitter configured to provide an optical signal for transmitting a quantum key. The transmitter comprises opto-electronic circuitry configured to generate a quantum signal comprising a sequence of frames, and to generate a pilot signal comprising a sequence of signatures such that the sequence of signatures is in synchrony with the sequence of frames. The opto-electronic circuitry is further configured to generate the optical signal by modulating an optical carrier based on the quantum signal and the pilot signal.

Thereby, the transmitter provides an optical signal for quantum key distribution that includes synchronization information modulated onto the pilot signal. Using the pilot signal for synchronization has the advantage that no additional frame or trigger channel is required. This in turn has the further advantage that processing requirements for recovering the synchronization information are reduced.

According to an implementation of the first aspect, the opto-electronic circuitry is configured to generate a first periodic signal and a second periodic signal. The first periodic signal and the second periodic signal have a constant phase shift relative to each other. The opto-electronic circuitry is further configured to generate the quantum signal based on the first periodic signal, and to generate the pilot signal based on the second periodic signal.

Thereby, synchronization of the pilot signal and the quantum signal is achieved. A receiver will thus be able to correctly interpret the quantum signal and to determine the quantum key, which is organized in the sequence of frames. The first periodic signal and the second periodic signal may be identical signals, e.g., they may be generated from one periodic signal.

According to an implementation of the first aspect, the opto-electronic circuitry is configured to: generate a modulated quantum carrier by modulating a first carrier with the quantum signal, and to generate the pilot signal by modulating a second carrier with the sequence of signatures. The second carrier is separated from the first carrier in frequency and/or in time. The opto-electronic circuitry is further configured to modulate the optical carrier with the modulated quantum carrier and the modulated pilot carrier.

Thereby, the pilot signal and the modulated quantum carrier use different frequencies and/or are present at different times. Interference between the pilot signal and the modulated quantum carrier can thus be avoided.

According to an implementation of the first aspect, the second carrier is a single-frequency tone signal and the sequence of signatures is modulated onto the second carrier using at least one of amplitude modulation, frequency modulation, or phase modulation.

Each of these modulation types has particular advantages in terms of resulting bandwidth and required effort for modulation and demodulation.

According to an implementation of the first aspect, the signature sequence is periodic.

Thereby, periodicity in the signal structure is added. This has the advantage that signature generation and detection is simplified.

According to an implementation of the first aspect, the signatures in the sequence of signatures and the frames in the sequence of frames are related to each other in a 1-to-N relationship with N being a natural number.

N may be 1 or greater than 1. In an implementation in which N is 1, there will be one signature with each frame. This will enable a receiver to identify the beginning of each frame particularly reliably and accurately. In an implementation in which N is greater than 1, the ratio between signature information and frames is reduced. This has the advantage that distortion of the pilot signal caused by the signatures is reduced.

According to an implementation of the first aspect, each element of the signature sequence is a pulse.

Thereby, the signature is defined in more detail. A pulse has the advantage that it can be easily generated and detected.

According to an implementation of the first aspect, the transmitter comprises an attenuator configured to attenuate the modulated optical carrier.

Thereby, the energy of the optical signal is reduced. This has the advantage that quantum properties of the quantum signal can be utilized.

According to a second aspect, the present application relates to a method for providing an optical signal for transmitting a quantum key. The method comprises generating a quantum signal comprising a sequence of frames. The method further comprises generating a pilot signal. The pilot signal comprises a sequence of signatures that is in synchrony with the sequence of frames. The method further comprises modulating an optical carrier based on the pilot signal and the quantum signal for providing the optical signal.

The optical signal for quantum key distribution will thus include a pilot channel carrying synchronization information. Using the pilot channel for synchronization has the advantage that no additional frame or trigger channel is required. This in turn has the further advantage that processing requirements are reduced.

According to an implementation of the second aspect a first periodic signal and a second periodic signal are generated, the first periodic signal and the second periodic signal having a constant phase shift relative to each other. The quantum signal is generated based on the first periodic signal and the pilot signal is generated based on the second periodic signal.

Thereby, synchronization of the pilot signal and the quantum signal is achieved. This has the advantage that a receiver will be able to determine the quantum key that is organized in the sequence of frames based on the pilot signal.

According to an implementation of the second aspect, a modulated quantum carrier is generated by modulating a first carrier with the quantum signal. The pilot signal is generated by modulating a second carrier with the sequence of signatures. The second carrier is separated from the first carrier in frequency and/or in time. The optical carrier is modulated with the modulated quantum carrier and the modulated pilot carrier.

Thereby, the pilot signal and the quantum signal use different frequencies and/or are present at different times. This has the advantage that interference between the pilot signal and the quantum signal is avoided.

According to an implementation of the second aspect, the second carrier is a single-frequency tone signal and the sequence of signatures is modulated onto the second carrier using at least one of amplitude modulation, frequency modulation, or phase modulation.

Each of these modulation types has advantages in terms of resulting bandwidth and required effort for modulation and demodulation.

According to an implementation of the second aspect, the signature sequence is periodic.

This has the advantage that signature generation and detection is simplified.

According to an implementation of the second aspect, the signatures in the sequence of signatures and the frames in the sequence of frames are related to each other in a 1-to-N relationship, wherein N is a natural number.

N may be 1 or greater than 1. In an implementation in which N is 1, there will be one signature with each frame. This will enable a receiver to identify the beginning of each frame particularly reliably and accurately. In an implementation in which N is greater than 1, the ratio between signature information and frames can be reduced. This has the advantage that the distortion of the pilot signal caused by the signatures is reduced.

According to an implementation of the second aspect, each element of the signature sequence is a pulse.

Thereby, the signature is defined in more detail. A pulse has the advantage that it can be easily generated and detected.

According to an implementation of the second aspect, the optical signal is attenuated.

Thereby, the energy of the optical signal is reduced. This has the advantage that the quantum properties of the quantum signal can be utilized.

According to a third aspect, the present application relates to a receiver configured to receive a quantum key carried by an optical signal. The optical signal comprises a quantum signal and a pilot signal. The quantum signal comprises a sequence of frames. The pilot signal comprises a sequence of signatures that is in synchrony with the sequence of frames. The receiver comprises opto-electronic circuitry configured to: extract the quantum signal and the pilot signal from the optical signal; extract the sequence of signatures from the pilot signal; identify frames of the quantum signal based on the sequence of signatures; and extract the quantum key from the quantum signal by interpreting the quantum signal in accordance with the sequence of frames.

The receiver can thus derive the quantum key from the received optical signal based on the sequence of signatures in the pilot signal. Using the pilot signal has the advantage that no additional frame or trigger channel is required. This in turn has the further advantage that processing requirements are reduced.

According to an implementation of the third aspect, the opto-electronic circuitry comprises a coherent optical detector configured to convert the optical signal into an electrical signal based on a local optical carrier.

Thereby, the information contained in the optical signal is down-converted into an electrical signal for further processing. This has the advantage that electrical circuits can be utilized for further processing.

According to an implementation of the third aspect, the opto-electronic circuitry comprises a filter configured to extract the pilot signal from the electrical signal.

Thereby, the pilot signal is separated from the electrical signal for further processing. This has the advantage of reducing the influence from signals other than the pilot signal when extracting the sequence of signatures.

According to an implementation of the third aspect, the opto-electronic circuitry comprises a slicer configured to compare the amplitude of the modulated pilot carrier against a threshold to obtain the sequence of signatures from the pilot signal.

Thereby, a pilot signal with amplitude modulated signatures is generated. This implementation has the advantage that it can be implemented by simple means.

According to an implementation of the third aspect, the opto-electronic circuitry comprises a first monostable multivibrator and a second monostable multivibrator configured to obtain the sequence of signature from the pilot signal.

Thereby, a pilot signal with frequency modulated signatures is generated. This implementation has the advantage that it can be implemented by simple means.

According to a fourth aspect, the present application relates to a method of receiving a quantum key. The method comprises receiving an optical signal which comprises a quantum signal and a pilot signal, the quantum signal comprising a sequence of frames, the pilot signal comprising a sequence of signatures that is in synchrony with the sequence of frames. The method further comprises extracting the quantum signal from the optical signal; extracting the pilot signal from the optical signal; extracting the sequence of signatures from the pilot signal; identifying frames of the quantum signal based on the sequence of signatures; and extracting the quantum key (S795) from the quantum signal by interpreting the quantum signal in accordance with the sequence of frames.

Thereby, the quantum key can be derived from the received optical signal based on the sequence of signature in the pilot signal. Using the pilot signal has the advantage that no additional frame or trigger channel is required. This in turn has the further advantage that processing requirements are reduced.

According to an implementation of the fourth aspect, the optical signal is converted into an electrical signal based on a local optical carrier.

Thereby, the information contained in the optical signal is down-converted into an electrical signal for further processing. This has the advantage that electrical circuits can be utilized.

According to an implementation of the fourth aspect, the pilot signal is extracted from the electrical signal.

Thereby, the pilot signal carrier is separated from the electrical signal for further processing. This has the advantage that when extracting the sequence of signatures the influence from signals other than the pilot signal is reduced.

According to an implementation of the fourth aspect, extracting the sequence of signatures comprises comparing the amplitude of the pilot signal against a threshold to obtain the sequence of signatures from the pilot signal.

This implementation has the advantage that it can be implemented by simple means.

According to an implementation of the fourth aspect, extracting the sequence of signatures further comprises determining the time between zero crossings of the modulated pilot carrier.

Thereby, an example implementation of a pilot signal with frequency modulated signatures is given. This implementation has the advantage that it can be implemented by simple means.

According to a fifth aspect, the present application relates to computer program having a program code for performing the method according to the second or fourth aspect, when the computer program runs on a computing device. The computing device may have a non-transitory computer readable medium storing computer executable instructions thereon, that when executed by a processor causes the computer to perform the computer executable instructions.

Thereby, the method can be performed in an automatic and repeatable manner. Advantageously, the computer program can be respectively performed at the transmitter according to the second aspect or at the receiver according to the fourth aspect.

More specifically, it should be noted that the above apparatuses, i.e., the transmitter and the receiver, may each be implemented as or comprise a discrete hardware circuitry (e.g., with discrete hardware components, integrated chips or arrangements of chip modules), or a signal processing device or chip controlled by a software routine or program stored in a memory, written on a computer-readable medium or downloaded from a network such as the internet.

It shall further be understood that a preferred embodiment of the present application can also be any combination of the dependent claims or above embodiments with the respective independent claim.

These and other aspects of the present application will be apparent and elucidated with reference to the embodiments described hereinafter.

BRIEF DESCRIPTION OF THE DRAWINGS

The above aspects and implementation forms of the present application will be explained in the following description of specific embodiments in relation to the enclosed drawings, in which.

DETAILED DESCRIPTION OF EMBODIMENTS OF THE PRESENT APPLICATION

Figure 1:
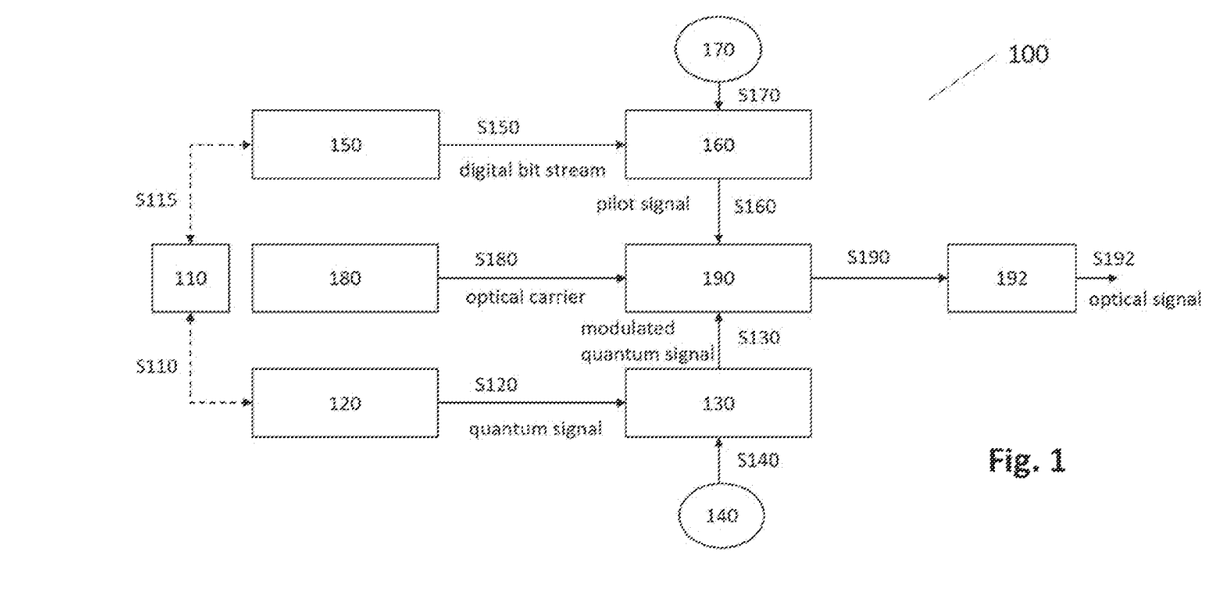
FIG. 1 shows a block diagram of a transmitter according to an embodiment of the present application.

FIG. 1 shows a block diagram of a transmitter 100 according to an embodiment.

The transmitter 100 comprises a first generator 120 configured to generate a quantum signal S120. The quantum signal S120 comprises a quantum key organized in a sequence of frames. A frame of a signal is the signal during a time slot. The signal can thus be viewed as a sequence of frames, or as comprising a sequence of frames. The time slot itself may also be referred to as a time frame or simply as a frame. From the context it will be clear in this disclosure whether the word "frame" means a time frame or the signal during a time frame. The frames may have the same length, i.e., each frame may have the same duration. In an implementation, each frame comprises a sequence of one or more symbols. For example, each frame may comprise the same number of symbols.

The transmitter 100 comprises a second generator 150, 160 configured to generate a pilot signal S160. The pilot signal S160 provides frequency information, phase information and frame synchronisation information for a receiver. According to an embodiment, the pilot signal S160 is a second carrier signal S170 modulated with the sequence of signatures that is represented by a digital bit stream S150. The modulation scheme may be frequency modulation, phase modulation and/or amplitude modulation. The second carrier signal S170 may be a pure single-frequency tone signal generated by, e.g., a second local oscillator 170. Moreover, the disturbance of the pilot tone due to the signature should be small.

The transmitter 100 comprises a synchronization unit 110. In an embodiment, the synchronization unit 110 is coupled to both the first generator 120 and the second generator 150, 160. In an embodiment, the synchronization unit 110 generates a first periodic signal S110 and a second periodic signal S115 that may have a constant phase shift relative to each other. The first periodic signal S110 is used by the first generator 120 to synchronize the generation of the sequence of frames of the quantum signal S120. The second periodic signal S115 is used by the second generator 150, 160 to synchronize the generation of the sequence of signatures of the pilot signal S160. Thus, the sequence of signatures is in synchrony with the sequence of frames. The sequence of signatures thus provides temporal information about the sequence of frames. This temporal information may be the beginning of a frame, the end of a frame or any fixed position within a frame. In an embodiment, the first periodic signal S110 and the second periodic signal S115 are in phase with each other, i.e. have a zero phase shift relative to each other.

The transmitter comprises a first modulator 130 that is configured to generate a modulated quantum carrier signal S130 by modulating a first carrier signal S140 with the quantum signal S120. The first carrier signal S140 may be generated by a first local oscillator 140, for example.

In an embodiment, the first carrier signal S140 and the second carrier signal S170 have a different frequency. The modulated quantum carrier S130 and the pilot signal S160 are thus separated in frequency. In another embodiment, the modulated quantum carrier S130 and the pilot signal S160 may be separated in time, i.e., at a given time only one of the modulated quantum carrier S130 and the modulated pilot signal S160 is present. The separation in frequency and/or time has the advantage that modulated quantum carrier S130 and the pilot signal S160 do not interfere with each other.

The transmitter 100 further comprises an optical modulator 190 configured to generate an optical signal S190 by modulating an optical carrier S180 with the modulated quantum carrier S130 and the pilot signal S160. The optical carrier S180 is generated by an optical source 180, e.g., a LASER. In an embodiment, the optical modulator 190 is an I/Q modulator. Thus, the optical signal S190 includes both the pilot signal S160 comprising the sequence of signatures and the quantum signal S120 comprising the sequence of frames.

The transmitter 100 further comprises an optical attenuator 192 providing the optical output signal S192. The optical attenuator reduces the energy of the optical signal S190 generated by the optical modulator 190 such that the modulated quantum carrier S130 provides the desired quantum properties for QKD.

In an embodiment, the second generator 150, 160 may generate the pilot signal S160 as an amplitude modulated signal. The modulated quantum carrier may be phase modulated, for example.

Figure 2:
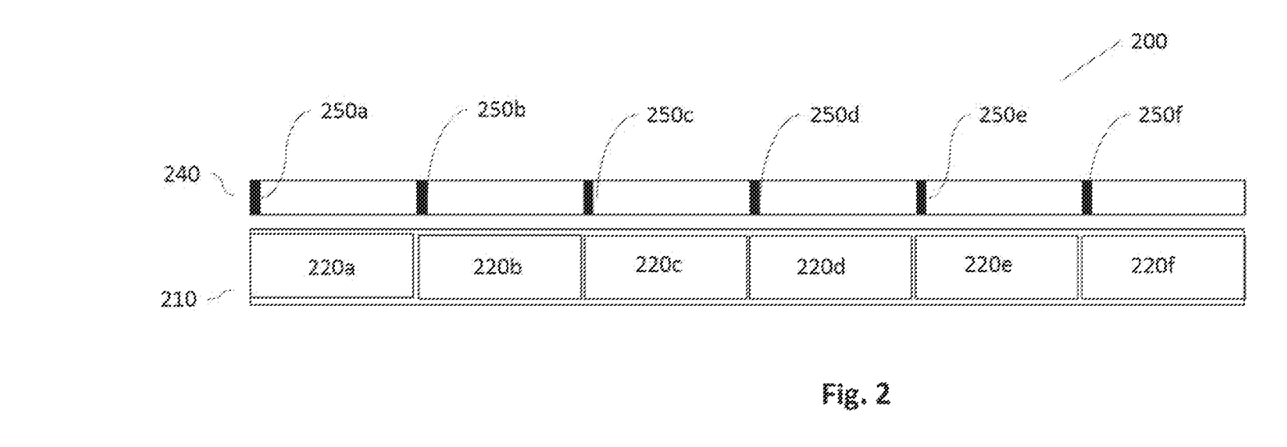
FIG. 2 shows a sequence of signatures and a sequence of frames according to an embodiment of the present application.

FIG. 2 shows the temporal relation between a pilot signal comprising a periodic sequence of signatures 240 and the quantum signal organized as a periodic sequence of frames 210 according to an embodiment. The sequence of signatures 240 comprises signatures 250a-250f (in the figure, these are shown as solid filled blocks). There is a one-to-one correspondence (i.e. a one-to-one relationship) between the signatures 250a-250f and the frames 220a-220f More specifically, signature 250a is associated with frame 220a, signature 250b is associated with frame 220b, and so on. Each frame may be substantially simultaneous with its associated signature. That is, any positive or negative delay between the frame and its corresponding signature may be quite short, e.g., shorter than the duration of the frame. In the example of FIG. 2, each signature (e.g., signature 220c) is in synchrony with the beginning of its associated frame (e.g., 250c). In other embodiments, each signature may be in synchrony with the end of the corresponding frame or with any other point in time defined by the corresponding frame.

Figure 3:
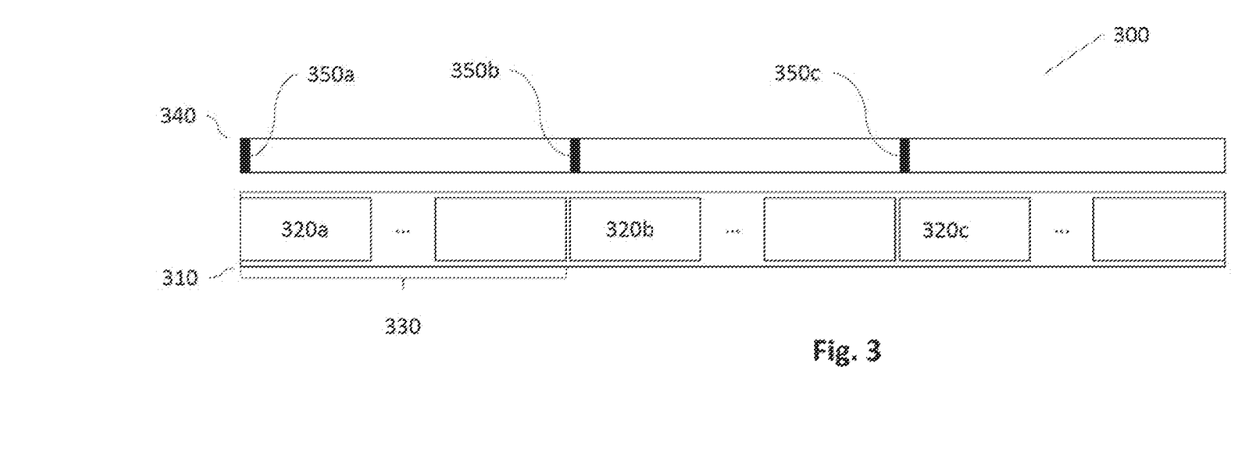
FIG. 3 shows a sequence of signatures and a sequence of frames according to another embodiment of the present application.

FIG. 3 shows the temporal relation between a pilot signal comprising a sequence of signatures 340 and a quantum signal organized as a sequence of frames 310 according to another embodiment. In this embodiment, the signatures in the sequence of signatures 340 and the frames in the sequence of frames 310 are related to each other in a 1-to-N relationship, wherein N is a natural number. Each signature thus indicates the beginning of a group of N frames 320a-320c. N may, for example, be 1, 2, 3, 4, 5, or 6. If N=1, each group consists of a single frame and no distinction between groups and frames needs to be made in this case. Using one signature for a group of N frames 320a-320c has the advantage that distortion of the pilot signal due to the signatures is reduced. Similarly, as in FIG. 2, the solid filled blocks represent signatures 350a, 350b. and 350c. As depicted in FIG. 3, a particular signature is in synchrony with the beginning of a group of N frames 320a-320c. In other embodiments, the signature may be in synchrony with the end of a group of N frames 320a-320c or any particular position within the group of N frames 320a-320c.

Figure 4:
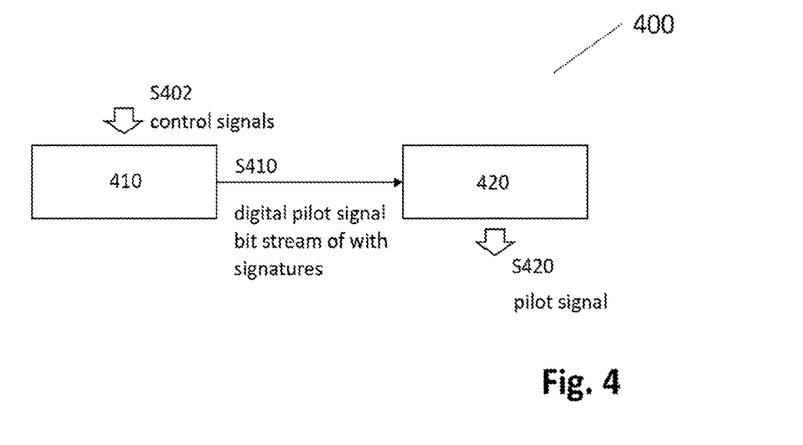
FIG. 4 shows a block diagram of a generator for generating the pilot signal according to an embodiment of the present application.

FIG. 4 shows a block diagram of a generator 400 for generating a pilot signal S420 according to an embodiment. The generator 400 corresponds to the second generator 150, 160 of FIG. 1. The generator 400 comprises a digital bit stream generator 410 that is configured to provide a digital bit stream S410 representing the sequence of signatures. The bit stream generator 410 is controlled by control signals S402. The control signals S402 may be the second periodic signal S115 from the synchronization unit 110. The control signals S402 may also be used to select a particular signature from a plurality of signatures that is used in the sequence of signatures. Preferably, the signature is programmable. Using a programmable signature has the advantage that the transmitter 100 can be used in a more flexible manner, e.g., in different systems. Moreover, the signature may provide additional information such as a format indication or an operation state. The generator 400 further comprises a digital-to-analog converter 420 that converts the digital pilot signal bit stream S410 into a pilot signal S420. The pilot signal S420 may, for example, be a pure single-frequency carrier that is modulated (e.g., phase modulated or frequency modulated) with the sequence of signatures.

Figure 5:
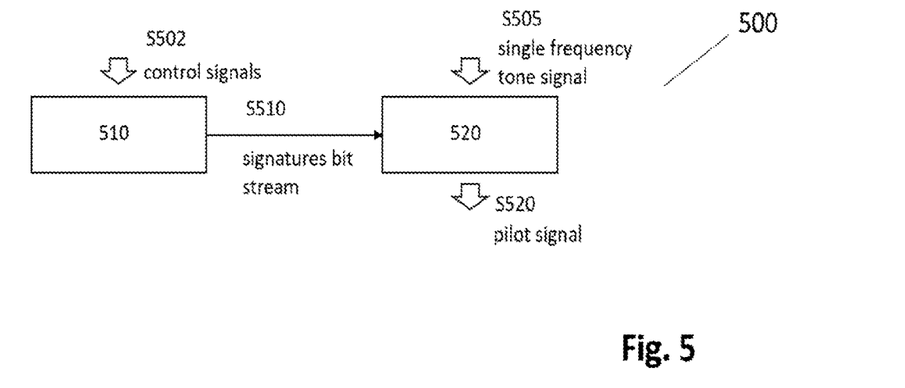
FIG. 5 shows a block diagram of a generator for generating the pilot signal according to another embodiment of the present application.

FIG. 5 shows a block diagram of a generator 500 for generating a pilot signal S520 according to another embodiment. The generator 400 corresponds to the second generator 150, 160 of FIG. 1. The generator 500 comprises a bit stream generator 510 that is configured to provide a digital bit stream S510 representing the sequence of signatures. The bit stream generator 510 is controlled by control signals S502. A control signal of the control signals S502 may be the second periodic signal S115 from the synchronization unit 110. Similarly to FIG. 4, the control signals S502 may also be used to select a particular signature from a plurality of signatures. Preferably, the signature is programmable. Using a programmable signature has the advantage that the transmitter can be used in a more flexible manner, e.g., in different systems. Moreover, the signature may provide additional information such as a format indication or an operation state. The generator 500 further comprises an amplitude modulator 520 that modulates the amplitude of a single frequency tone signal S505 according to the digital bit stream S510. The pilot signal S520 may, for example, be a pure single frequency carrier S505 that is modulated in amplitude by the sequence of signatures.

Figure 6:
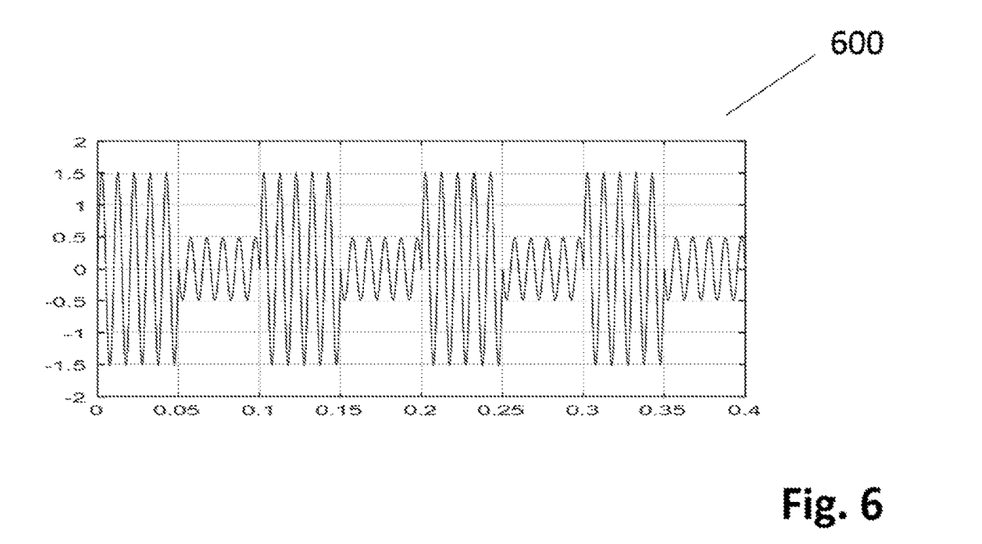
FIG. 6 shows an exemplary pilot signal waveform generated by the generator of FIG. 5.

FIG. 6 shows an exemplary pilot signal waveform 600 generated by generator 500. Based on the digital bit stream S510, the amplitude of waveform 600 is modified. The digital bit stream S510 may consist of a sequence of digital values comprising 0 and 1. Alternatively, the digital values may comprise −1 and +1. Each of the digital values is associated with an amplitude of the waveform. In an embodiment, the digital value of +1 may be associated with an amplitude of 3 V (peak-to-peak) and the digital value of −1 may be associated with an amplitude of −1 V (peak-to-peak). Thus, waveform 600 represents the sequence +1 −1 +1 −1 +1 −1 +1 −1.

Figure 7:
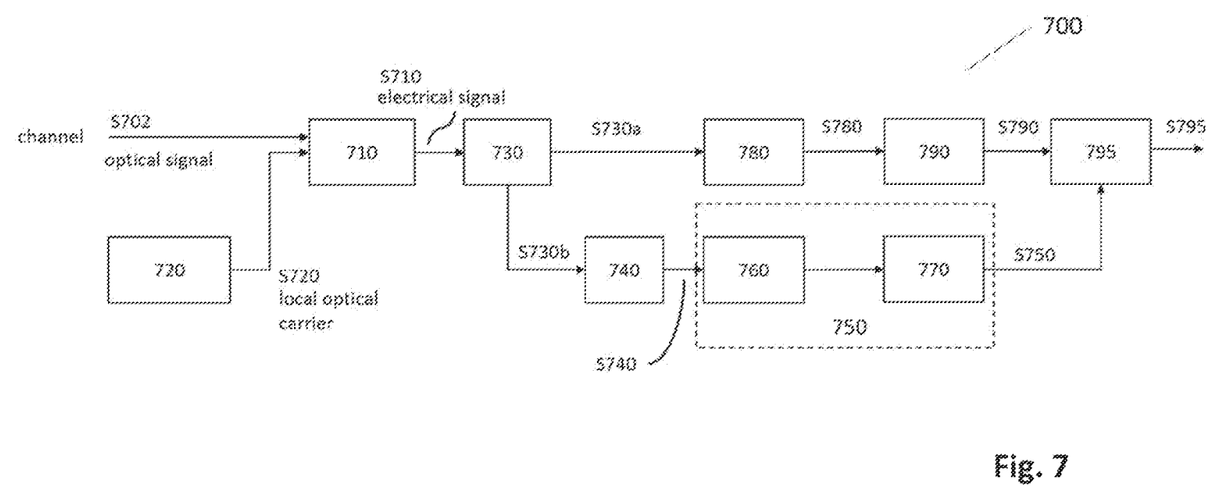
FIG. 7 shows a receiver block diagram according to an embodiment of the present application.

FIG. 7 shows a receiver block diagram 700 according to an embodiment. The receiver 700 receives an optical signal S702. The optical signal S702 may have been generated by the transmitter 100 of FIG. 1, for example. The optical signal S702 may comprise a quantum signal comprising a quantum key organized in a sequence of frames. The optical signal S702 may further comprise a pilot signal which provides frequency information, phase information and frame synchronisation information. The receiver 700 may use this information to correct for channel impairments. The pilot signal further comprises a sequence of signatures that is in synchrony with the sequence of frames. Thus, the pilot signal can be advantageously used to obtain temporal information about the sequence of frames.

The receiver 700 comprises opto-electronic circuitry 710, 730, 780, 790 configured to extract the quantum signal S790 from the optical signal. The optical signal S702 is converted into an electrical signal S720 by a coherent detector 710 using a local optical carrier S720. The local optical carrier S720 is generated by a local optical source 720. The local optical source 720 may be a LASER. The resulting electrical signal S710 may be a radio frequency signal with a frequency in, e.g., the 1 GHz range. Alternatively, other frequency ranges may be used. The electrical signal S710 is divided by splitter 730 into a first electrical signal portion S730a and a second electrical signal portion S730b. The first electrical signal portion 730a and the second electrical signal portion 730b comprise both a quantum carrier signal and the pilot signal. The first electrical signal portion S730a and the second electrical signal portion S730b may have the same energy.

The first electrical signal portion S730a is converted into a digital data stream S780 by analog-to-digital converter 780. The digital data stream S780 is digitally processed by digital signal processor 790 to extract the quantum signal S790.

The receiver 700 further comprises opto-electronic circuitry 710, 730, 740 configured to extract the pilot signal S740 from the optical signal S702. After converting the optical signal S702 into an electrical signal S710 by coherent detector 710, as described above, the second electrical signal portion S730b is filtered by bandpass filter 740. The bandpass filtered signal S740 comprises the pilot signal but not the quantum carrier. A decoder 750 extracts the sequence of signatures from the bandpass filtered signal S740 and generates a frame trigger signal S750. The frame trigger signal S750 is in synchrony with a sequence of frames of the quantum signal S790.

The receiver 700 further comprises a framer 795 that receives the quantum signal S790 and the frame trigger signal S750 and extracts the quantum key S795 from the quantum signal by interpreting the quantum signal in accordance with the sequence of frames. Interpreting the quantum signal S790 means extracting information (e.g., bits or symbols) from the quantum signal S790.

In an embodiment, the decoder 750 may be a decoder for a pilot signal that comprises a single-frequency carrier signal modulated in amplitude with the sequence of signatures. The decoder 750 comprises a slicer 760 and a synthesizer 770. The slicer 760 extracts the sequence of signatures from the bandpass filtered signal by applying thresholds to the envelope of the signal. The resulting signal is used by the synthesizer 770 to generate a high quality clock signal corresponding to the frame trigger signal S750. The synthesizer 770 may be a PLL.

Figure 8:
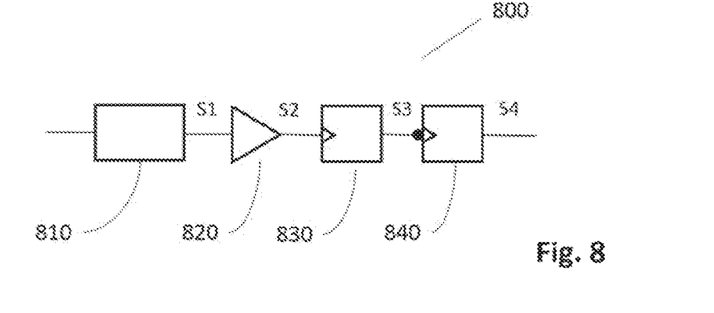
FIG. 8 shows a decoder block diagram according to an embodiment of the present application.
Figure 9:
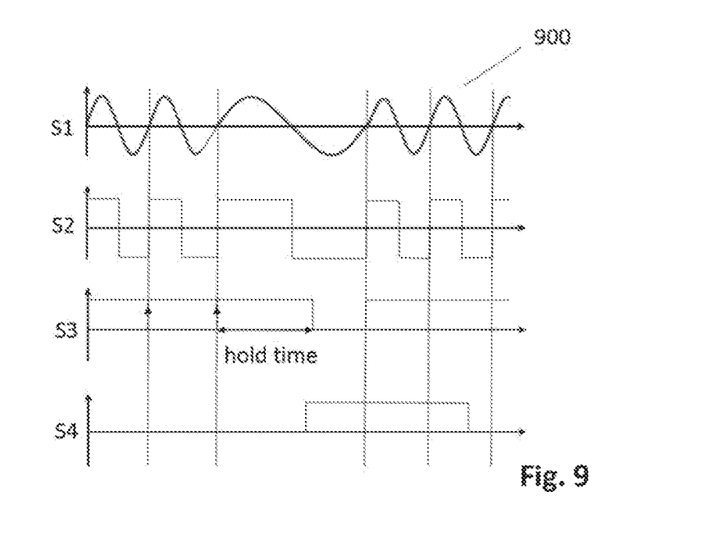
FIG. 9 shows a decoder waveform according to an embodiment of the present application.

FIG. 8 shows a decoder 800 block diagram according to an embodiment of the receiver 700. Decoder 800 is configured to decode a pilot signal that is a single-frequency carrier signal modulated in frequency by a sequence of signatures. The decoder 800 comprises a filter 810 that is adapted to (e.g., matched to or optimized for) the sequence of signatures. The filter 810 is referred to herein as an optimized filter or as a matched filter. An example waveform S1 of the filtered signal of the embodiment is depicted in FIG. 9.

A comparator 820 detects zero-crossings of signal S1 and generates a square wave signal S2. The positive edge of the signal S2 triggers a retriggerable monostable multivibrator 830. If the time between two zero crossings exceeds the hold time, the retriggerable monostable multivibrator 830 will be reset and a monostable multivibrator 840 will be triggered to generate the frame trigger signal S4 with a certain length according to the hold time of the monostable multivibrator 840. The frame trigger signal S5 corresponds to the frame trigger signal S750 of receiver 700.

Figure 10:
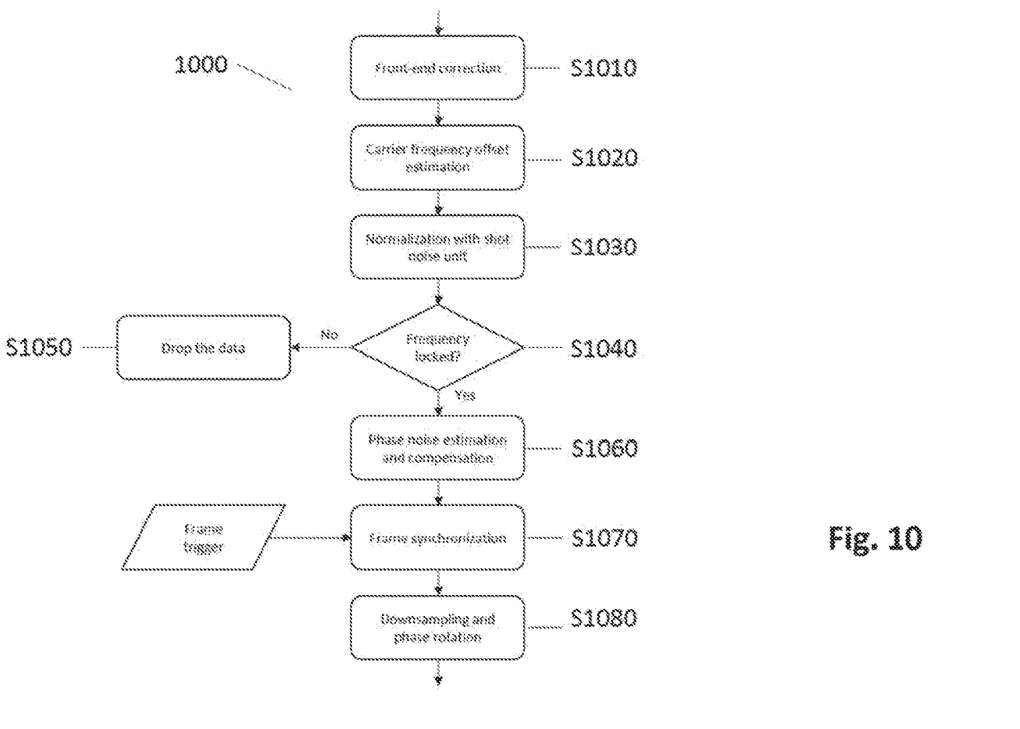
FIG. 10 shows a flow diagram for demodulating the quantum signal according to an embodiment of the present application.

FIG. 10 shows a flow diagram for demodulating the quantum signal according to an embodiment. The flow diagram may be executed by a digital signal processor 790. Demodulating the quantum signal includes the step S1010 of frontend correction, which corrects for imperfections of the analog-to-digital converter 780, splitter 730 and coherent detector 710. In step S1020, the carrier frequency offset is estimated based on, e.g., the pilot signal. In step S1030 a normalization with a shot noise unit is performed. In step S1040 the frequency state is checked. If the frequency state is "not locked", data is dropped in step S1050. If the frequency state is "locked", the phase noise is estimated and compensated in step S1060.

In an embodiment, the framer 795 is included in digital signal processor 790. In this embodiment, frame trigger signal S750 from the decoder 750 is used for frame synchronization step S1070. In step 1080, the resulting signal is down sampled and phase rotated to obtain the quantum key S795.

In another embodiment, the steps S1070 and S1080 may be carried out by framer S795.

While the present application has been illustrated and described in detail in the drawings and the foregoing description, such illustration and description are to be considered illustrative or exemplary and not restrictive. The present application is not limited to the disclosed embodiments. From reading the present disclosure, other modifications will be apparent to a person skilled in the art. Such modifications may involve other features, which are already known in the art and may be used instead of or in addition to features already described herein.

The present application has been described in conjunction with various embodiments herein. However, other variations to the disclosed embodiments can be understood and effected by those skilled in the art in practicing the claimed embodiments, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present application has been described with reference to specific features and embodiments thereof, it is evident that various modifications and combinations can be made thereto without departing from the spirit and scope of the present application. The specification and drawings are, accordingly, to be regarded simply as an illustration of the embodiments as defined by the appended claims, and are contemplated to cover any and all modifications, variations, combinations or equivalents that fall within the scope of the present application.

What is claimed is:

1. A transmitter configured to provide an optical signal for transmitting a quantum key, the transmitter comprising opto-electronic circuitry configured to:
   generate a quantum signal comprising a sequence of frames;
   generate a pilot signal comprising a sequence of signatures that is in synchrony with the sequence of frames; and
   generate the optical signal by modulating an optical carrier based on the quantum signal and the pilot signal,
   wherein the signatures in the sequence of signatures and the frames in the sequence of frames are related to each other in a 1-to-N relationship, wherein N is a natural number greater than 1, and
   the sequence of signatures provides temporal information about the sequence of frames, and this temporal information is at one of a beginning of the respective frame, at an end of the respective frame or at any fixed position within the respective frame, any delay between the respective frame and its corresponding signature is shorter than a duration of the respective frame, and a duration of the corresponding signature is shorter than the duration of the respective frame.

2. The transmitter according to claim 1, wherein the opto-electronic circuitry is further configured to:
   generate a first periodic signal and a second periodic signal, the first periodic signal and the second periodic signal having a constant phase shift relative to each other;
   generate the quantum signal based on the first periodic signal; and
   generate the pilot signal based on the second periodic signal.

3. The transmitter according to claim 1, wherein the opto-electronic circuitry is further configured to:
   generate a modulated quantum carrier by modulating a first carrier with the quantum signal;
   generate the pilot signal by modulating a second carrier with the sequence of signatures, wherein the second carrier is separated from the first carrier in frequency and/or time; and
   modulate the optical carrier with the modulated quantum carrier and the pilot signal.

4. The transmitter according to claim 3, wherein the second carrier signal is a single-frequency tone signal and the sequence of signatures is modulated onto the second carrier using at least one of amplitude modulation, frequency modulation, or phase modulation.

5. The transmitter according to claim 1, wherein the signature sequence is periodic.

6. The transmitter according to claim 1, wherein each element of the signature sequence is a pulse.

7. The transmitter according to claim 1, further comprising an attenuator configured to attenuate the modulated optical carrier.

8. A method for providing an optical signal for transmitting a quantum key, the method comprising:
   generating a quantum signal comprising a sequence of frames;
   generating a pilot signal comprising a sequence of signatures that is in synchrony with the sequence of frames;
   modulating an optical carrier based on the pilot signal and the quantum signal for providing the optical signal,
   wherein the signatures in the sequence of signatures and the frames in the sequence of frames are related to each other in a 1-to-N relationship, wherein N is a natural number greater than 1, and the sequence of signatures provides temporal information about the sequence of frames, and this temporal information is at one of a beginning of the respective frame, at an end of the respective frame or at any fixed position within the respective frame, any delay between the respective frame and its corresponding signature is shorter than a duration of the respective frame, and a duration of the corresponding signature is shorter than the duration of the respective frame.

9. A receiver configured to receive a quantum key carried by an optical signal, the optical signal comprising a quantum signal and a pilot signal, the quantum signal comprising a sequence of frames, the pilot signal comprising a sequence of signatures that is in synchrony with the sequence of frames, the receiver comprising opto-electronic circuitry configured to:

extract the quantum signal and the pilot signal from the optical signal;

extract the sequence of signatures from the pilot signal;

identify frames of the quantum signal based on the sequence of signatures; and extract the quantum key from the quantum signal by interpreting the quantum signal in accordance with the sequence of frames, wherein the signatures in the sequence of signatures and the frames in the sequence of frames are related to each other in a 1-to-N relationship, wherein N is a natural number greater than 1, and the sequence of signatures provides temporal information about the sequence of frames, and this temporal information is at one of a beginning of the respective frame, at an end of the respective frame or at any fixed position within the respective frame, any delay between the respective frame and its corresponding signature is shorter than a duration of the respective frame, and a duration of the corresponding signature is shorter than the duration of the respective frame.

10. The receiver of claim 9, wherein the opto-electronic circuitry comprises a coherent optical detector configured to convert the optical signal into an electrical signal based on a local optical carrier.

11. The receiver according to claim 10, wherein the opto-electronic circuitry comprises a filter configured to extract the pilot signal from the electrical signal.

12. The receiver according to claim 11, wherein the opto-electronic circuitry comprises a slicer configured to compare an amplitude of the pilot signal against a threshold to obtain the sequence of signatures from a modulated pilot carrier.

13. The receiver according to claim 11, wherein the opto-electronic circuitry comprises a first monostable multivibrator and a second monostable multivibrator configured to obtain the sequence of signatures from the pilot signal.

* * * * *